Patented May 9, 1933

1,907,868

UNITED STATES PATENT OFFICE

EDWARD R. POWELL, OF ALEXANDRIA, INDIANA, ASSIGNOR TO BANNER ROCK CORPORATION, OF ALEXANDRIA, INDIANA, A CORPORATION OF DELAWARE

ROCK WOOL AND COMPOSITION FOR PRODUCING THE SAME

No Drawing. Original application filed January 5, 1927, Serial No. 159,228. Divided and this application filed January 16, 1928. Serial No. 247,177.

This invention relates to a method of, and composition for producing a more stable and permanent rock or mineral wool.

This application is a division of my patent application, Serial No. 159,228, filed January 5, 1927, and issued as U. S. Patent No. 1,656,828 on Jan. 17, 1928.

Among the several objects of the invention may be noted the provision of a method and composition for making a rock or mineral wool which is substantially free of sulphides and contains a high ratio of silica to basic materials, whereby the stability and permanency of the compounds composing the wool is increased. Other objects will be in part obvious and in part pointed out hereinafter.

Rock wool or mineral wool is made as described in said patent. The selected rock or slag is heated in a cupola furnace provided with a charging inlet at the top and an outlet at the bottom through which the fluid product escapes. As the fluid product issues from the outlet, it is blown into the form of long fibres which are cooled and collected as mineral wool.

The theory and operation of the cupola is as follows:

Argillaceous limestone containing (broadly) silica, alumina, lime and magnesia (and a trace of sulphur as an inherent impurity); or slag (containing higher percentages of sulphur as inherent impurities) is loaded into the cupola in lump size.

It is to be understood that so-called rock wool is made directly from the rock which contains only a slight trace of sulphur; while so-called mineral wool is made from the slag which contains higher percentages of sulphur. In either case, however, the sulphur may become detrimental to the resulting wool product if the sulphur is permitted to take a sulphide form, although a sulphate form is less harmful. The term "rock wool" as used in the claims includes the product made from either rock or slag.

For instance, calcium sulphide is detrimental to the resulting wool composition because it tends to react with the dilute acids often found in the moisture of the atmosphere. This reaction gives off hydrogen sulphide gas which is soluble in the atmospheric moisture. Hence, if any large percentage of sulphides of calcium or other elements are contained in the wool, it is rendered a substantially unstable composition or compound. Such a composition is therefore not a permanent or desirable material for purposes of construction. The sulphides also corrode many metals when wet, which is highly undesirable.

On the other hand, sulphates of calcium or other elements are harmless in the wool because they do not render it an unstable composition. There is little or no tendency for the action above described, to take place, that is, due to the presence of calcium sulphate or other sulphates.

Inasmuch as sulphur is a widely diffused element present in most fuels and many rocks (at least in traces), it is desirable that the process of making rock or mineral wool be carried out so that none of the sulphur will be reduced to the sulphide form; or if already present as a suphide, that it be oxidized to the sulphate form.

To carry the above principle into effect, the fuel is burned in a region such that complete combustion takes place before the products of combustion contact with the raw material to be fused, that is, the fuel is burned in a separate combustion chamber, preferably with an excess of air; instead of being burned with the material (as has been done heretofore) by packing it into the cupola with said material. Hence substantially no reducing action takes place near the rock in the present invention. Incidentally, the sulphur content of the fuel is prevented from being added to that of the rock and product thereof, to aggravate the recited difficulties.

When sulphides are present in the raw rock or slag, it is necessary to oxidize them to sulphates if a sulphide-free rock wool is to be obtained. This cannot always be accomplished by an oxidizing flame, because heat may be received indirectly by the material, which will melt and run down to the outlet without being oxidized.

To prevent the above disadvantage, a fusible oxidizing agent is introduced with the rock, slag or other raw material at the charging door. Suitable oxidizing agents may comprise preferably solid sodium nitrate, sodium chlorate or manganese dioxide. These materials fuse with the melting rock and give off oxygen in the liquid, thereby oxidizing the sulphides present to sulphates. As in the case of the excess air, it is desirable to use an excess of the above oxidizing agents so that the action is positively complete. All excess oxygen will bubble to the surface of the melt and pass off as a harmless gas.

The liquid rock trickles from the rock charge in the cupola and forms a pool from which the efflux at the outlet is fed. As the charge in the cupola melts down, more raw rock may be fed in at the charging door. The fresh rock is preheated by the upflowing gases as said rock descends to the melting zone.

In the above manner a sulphide-free liquid rock is made to flow from the outlet. The rock is blown into wool, collected, and treated to remove small drops or shot, suitably as described in my said patent.

Another point of novelty exists in the present invention, based upon the chemical proportions of the charge introduced into the fusion chamber or cupola 1. Up to this point, the nature of the rock charge has been only broadly outlined.

For instance, in the prior art a typical analysis of resulting rock wool would be (more specifically):

| Substance | % by weight and reaction |
|---|---|
| Silicon oxide ($SiO_2$) | 40 (acid) |
| Aluminum oxide ($Al_2O_3$) | 17 (neutral) |
| Iron oxide (FeO) or ($Fe_2O_3$) | 6 (basic) |
| Calcium oxide (CaO) | 21 (basic) |
| Magnesium oxide (MgO) | 13 (basic) |
| Miscellaneous | 3 |
| Total | 100 |

The above list shows a ratio of one part by weight to one of silicon oxide to basic materials. The result is that a tendency to slacking is had which disintegrates the wool in its applications. Another is that the wool will decompose in dilute mineral acids.

The wool material resulting in the present invention comprises a typical analysis as follows:

| Substance | % by weight and reaction |
|---|---|
| Silicon oxide ($SiO_2$) | 57 (acid) |
| Aluminum oxide ($Al_2O_3$) | 12 (neutral) |
| Iron oxide (FeO) | 5 (basic) |
| Calcium oxide (CaO) | 15 (basic) |
| Magnesium oxide (MgO) | 9 (basic) |
| Miscellaneous | 2 |
| Total | 100 |

It will be seen that the above comprises practically a two to one ratio, actually 1.96 parts of silica to 1 part of basic materials, which gives the resulting wool a more hard and glassy composition which will not slack or dissolve. A ratio of silica to basic materials of from one and one-half parts by weight to one, to two to one is suitable for preventing this slacking or disintegrating effect. The improved composition is attained by selecting the proper raw material, such as by adding a high silica rock.

On a molecular ratio basis, the composition containing 57% by weight of silica contains approximately 1.60 molecular proportions of silica for each molecular proportion of materials of basic properties as strong as those of the oxides of ferrous iron, calcium, and magnesium. This amount of silica is in excess of one and one-half molecular proportions for each one molecular proportion of the basic oxides.

In view of the above, it will be seen that the several objects of the invention are achieved and other advantageous results attained.

As many changes could be made without departing from the scope of the invention, it is intended that all matter contained in the above description shall be interpreted as illustrative and not in a limiting sense.

I claim:

1. A rock wool made from rock or a rock mixture containing 1 part by weight of basic materials, calculated as oxides of the metals, for approximately 2 parts of silica.

2. A rock wool made from rock or a rock mixture containing approximately 1.5 to 1.96 parts of silica to 1 part of oxides of iron, calcium and magnesium.

3. A rock wool comprising silica and basic materials in the ratio of one and one-half to two parts by weight of silica to one part by weight of basic materials.

4. An oxidized rock wool comprising silica and basic materials in the ratio of one and one-half to two parts by weight of silica to one part by weight of basic materials.

In testimony whereof, I have signed my name to this specification this 14th day of January, 1928.

EDWARD R. POWELL.